(12) United States Patent  
Yoshihara et al.

(10) Patent No.: US 7,674,027 B2
(45) Date of Patent: Mar. 9, 2010

(54) VEHICLE INTERIOR LAMP (75) Inventors: Tsuneo Yoshihara, Isehara (JP); Tomoyuki Saiga, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 202 days.

(21) Appl. No.: 11/889,490

(22) Filed: Aug. 14, 2007

(65) Prior Publication Data
US 2008/0049435 A1 Feb. 28, 2008

(30) Foreign Application Priority Data
Aug. 24, 2006 (JP) .............................. 2006-228367

(51) Int. Cl.
*B60Q 1/00* (2006.01)

(52) U.S. Cl. ...................... 362/547; 362/294; 362/373; 362/488; 362/545

(58) Field of Classification Search ................ 362/547, 362/373, 294, 488, 490, 545
See application file for complete search history.

(56) References Cited

U.S. PATENT DOCUMENTS

| | | | |
|---|---|---|---|
| 6,805,474 B2 | 10/2004 | Walser et al. | |
| 7,150,548 B2 | 12/2006 | Kohlmeier-Beckmann et al. | |
| 7,195,381 B2 * | 3/2007 | Lynam et al. | 362/494 |
| 7,207,702 B2 | 4/2007 | Walser et al. | |
| 7,307,391 B2 * | 12/2007 | Shan | 315/291 |
| 2001/0030866 A1 | 10/2001 | Hochstein | |
| 2003/0007357 A1 | 1/2003 | Veldman | |
| 2003/0043590 A1 | 3/2003 | Walser et al. | |
| 2004/0213005 A1 | 10/2004 | Kohlmeier-Beckmann et al. | |
| 2006/0092659 A1 | 5/2006 | Bynum | |
| 2006/0268238 A1 * | 11/2006 | Yoo | 353/52 |
| 2008/0049436 A1 * | 2/2008 | Yoshihara et al. | 362/488 |

FOREIGN PATENT DOCUMENTS

| | | |
|---|---|---|
| JP | 58-126231 A | 7/1983 |
| JP | 2002-331868 A | 11/2002 |
| JP | 02006267774 A * | 10/2006 |

OTHER PUBLICATIONS

U.S. Appl. No. 11/889,491, filed Aug. 14, 2007, Yoshihara et al.
T. Yoshihara, U.S. PTO Office Action, U.S. Appl. No. 11/889,491, dated Jun. 22, 2009, 10 pages.
T. Yoshihara, U.S. PTO Notice of Allowance, U.S. Appl. No. 11/889,491, dated Dec. 11, 2009, 8 pages.

* cited by examiner

*Primary Examiner*—Stephen F Husar
*Assistant Examiner*—James W Cranson
(74) *Attorney, Agent, or Firm*—Foley & Lardner LLP

(57) ABSTRACT

A light source has a unit structure including a main body, a light-radiating unit that is provided in the main body to radiate light, and a heat sink member that is provided in the main body. A lamp housing has a heat discharge opening at a position corresponding to the light source.

6 Claims, 10 Drawing Sheets

VEHICLE INTERIOR LAMP

CROSS-REFERENCE TO RELATED APPLICATIONS

The present document incorporates by reference the entire contents of Japanese priority document, 2006-228367 filed in Japan on Aug. 24, 2006.

BACKGROUND OF THE INVENTION

1. Field of the Invention

The present invention relates to a vehicle interior lamp that uses a semiconductor-type light source having light directionality as a light source. In particular, the present invention relates to a vehicle interior lamp that can efficiently discharge (release) heat generated from a light source.

2. Description of the Related Art

The above type of vehicle interior lamps has been conventionally known as exemplified by, for example, a vehicle interior lamp described in Japanese Patent Application Laid-Open No. 2002-331868. One of the conventional vehicle interior lamps is described below. A conventional vehicle interior lamp includes a light emitting diode (LED) arranged in a lamp chamber covered with a lamp cover which has a light-projection hole. Workings of the conventional vehicle interior lamp are as follows. When the LED lights up, the LED emits light which passes through the light-projection hole as spotlight and is projected onto a predetermined area within the interior of the vehicle. Semiconductor-type light sources such as LEDs consume low power and emit spotlight having light directionality, and therefore are suitable for the light source of the vehicle interior lamp.

The conventional vehicle interior lamps, however, do not take measures against heat generated from the LED. Therefore, there is a problem in the use of semiconductor-type light sources such as high-output LEDs in the conventional vehicle interior lamps.

SUMMARY OF THE INVENTION

It is an object of the present invention to at least partially solve the problems in the conventional technology.

A vehicle interior lamp according to one aspect of the present invention includes a light source that is a semiconductor-type light source having light directionality, the light source having a unit structure including a main body, a light-radiating unit that is provided in the main body to radiate light, and a heat sink member that is provided in the main body, a lamp housing having a heat-discharge opening arranged at a position corresponding to the light source, a lamp lens, and a lamp chamber delimited by the lamp housing and the lamp lens.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
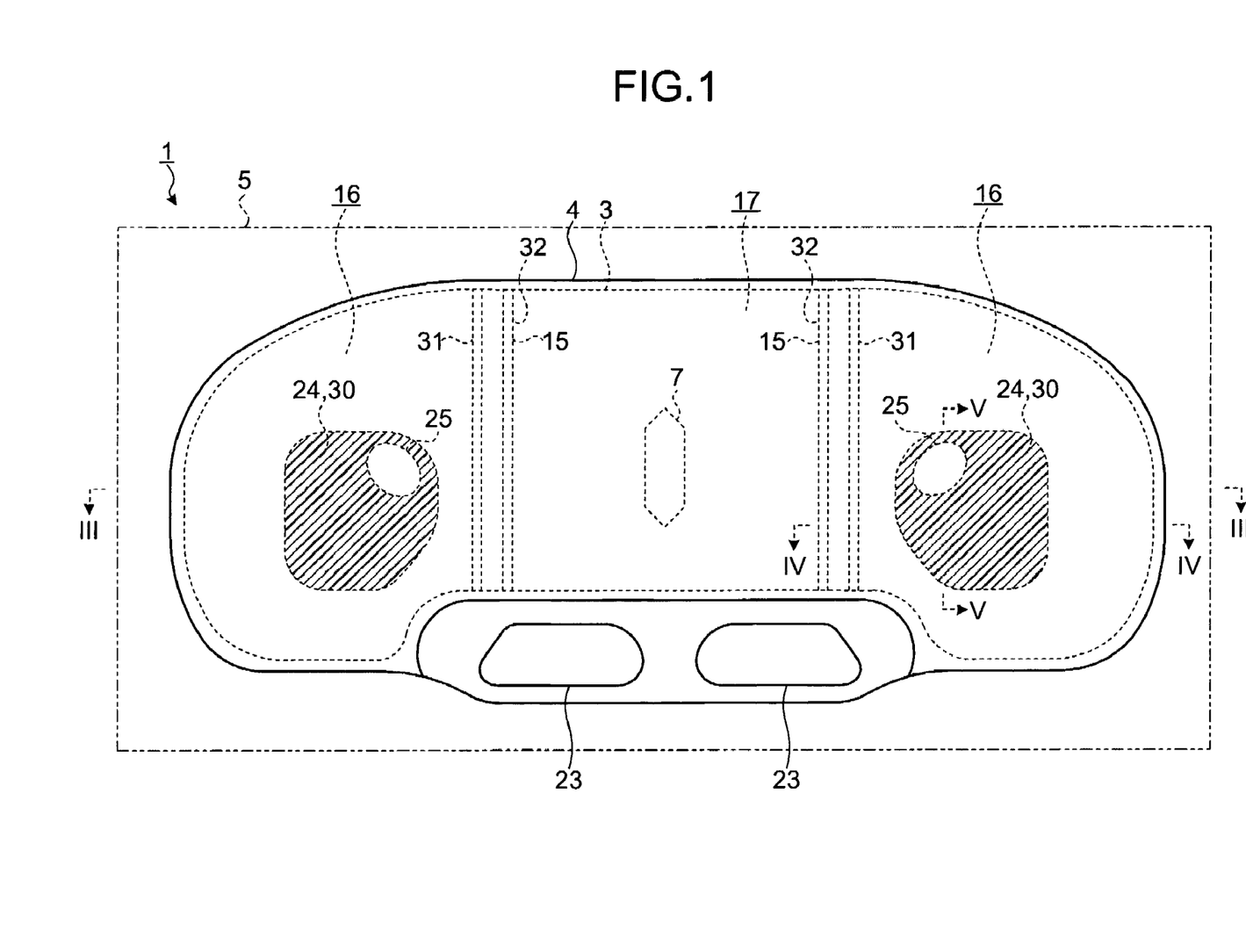
FIG. 1 is a front view of a vehicle interior lamp according to an embodiment of the present invention.
Figure 2:
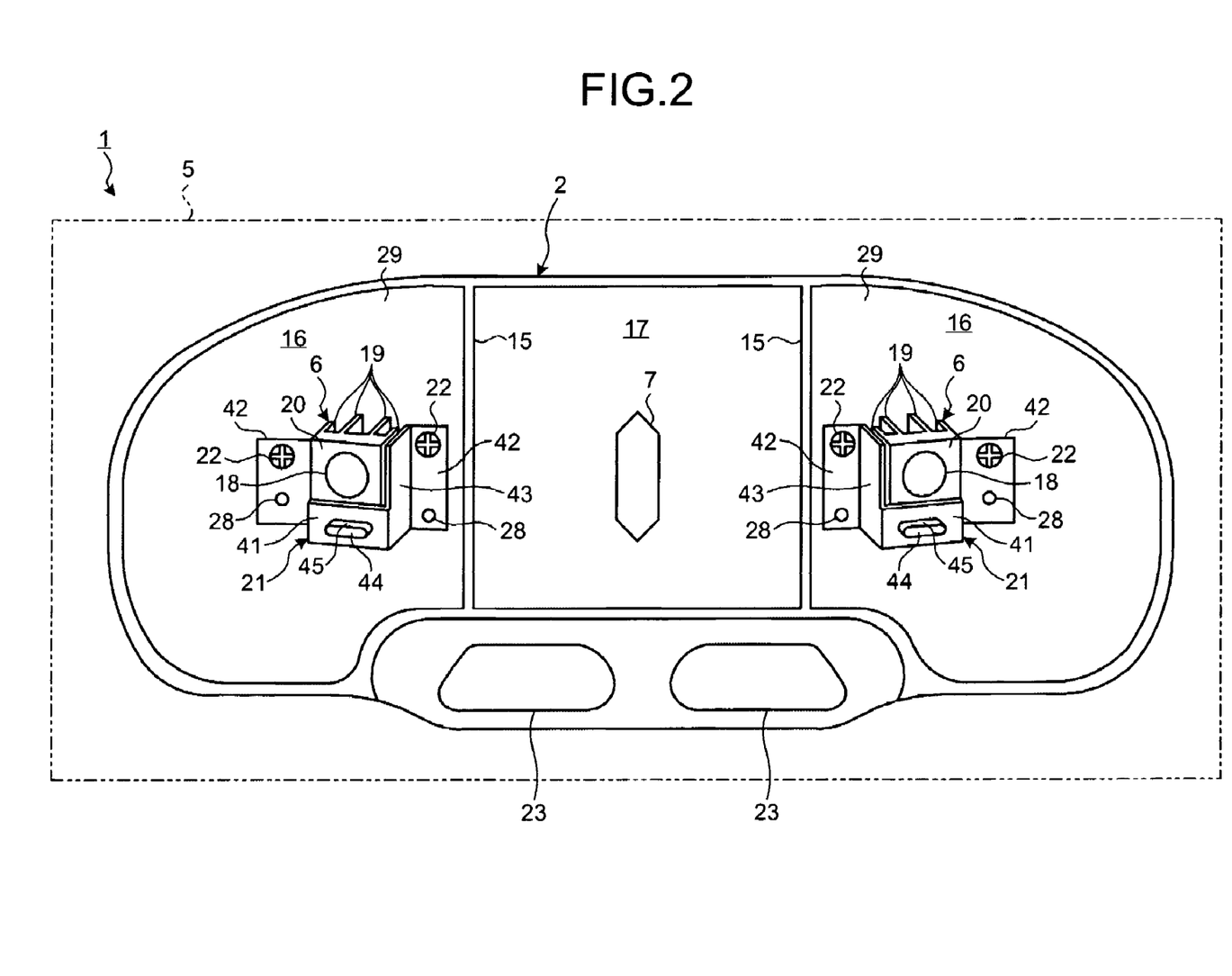
FIG. 2 is a front view of an interior of a spotlight lamp chamber and an interior of a wide-light lamp chamber with an inner lens and an outer lens removed from the vehicle interior lamp according to the embodiment.

Exemplary embodiments of a vehicle interior lamp according to the present invention will be described in detail below with reference to the accompanying drawings. The present invention is not limited to the embodiments. When the vehicle interior lamp according to the embodiment of the present invention is installed in a vehicle (see FIG. 10), a front side shown in FIGS. 1 and 2 becomes a bottom side (i.e., lower side). Further, when the vehicle interior lamp according to the embodiment of the present invention is installed in a vehicle (see FIG. 10), a back side shown in FIGS. 6 to 9 becomes a planar side (i.e., upper side).

A configuration of the vehicle interior lamp according to the embodiment will be described below. A vehicle interior lamp 1 according to the embodiment includes a lamp housing 2, an inner lens 3 and an outer lens 4 as lamp lenses, a lamp cover 5, a spotlight source 6 having a semiconductor-type light source having light directionality, a wide-light source 7, and a bracket 21.

The lamp housing 2 of the embodiment is a light tight member. The lamp housing 2 is of a U-shape in section with one side (i.e. front side) open and another side (i.e. back side) closed. The lamp housing 2 has an opening 8, and a step 9 is integrally formed along an edge of the opening 8. The lamp cover 5 of the embodiment is a light tight member. The lamp cover 5 has a cover-like shape. At a central portion of the lamp cover 5, an opening 10 of approximately the same size as that of the opening 8 of the lamp housing 2 is provided. Further, an inner step 11 is integrally formed along an edge of the opening 10 of the lamp cover 5. The step 9 of the lamp housing 2 fits around the inner step 11 of the lamp cover 5. In a fitted state, the lamp housing 2 is secured to the lamp cover 5 with a fixing unit (not shown) such as a screw or an elastic engagement member.

The outer lens 4 of the embodiment is an optically-transparent resin member. The outer lens 4 is of a shallow U-shape in section with one side (i.e., back side) open and another side (i.e., front side) closed. The outer lens 4 has an opening 12, and a wall 13 is integrally formed along an edge of the opening 12. The inner lens 3 is of a plate-like shape. The inner lens 3 is fitted inside the wall 13 of the opening 12 of the outer lens 4. In a fitted state, the inner lens 3 is secured to the outer lens 4 with a fixing unit (not shown) such as an elastic engagement member.

On an outer circumference of the lamp cover 5 outside the inner step 11, an outer step 14 is formed integrally. The wall 13 of the outer lens 4 to which the inner lens 3 is secured fits into the outer step 14 of the lamp cover 5 to which the lamp housing 2 is secured. In a fitted state, the outer lens 4 is secured to the lamp cover 5 with a fixing unit (not shown) such as an elastic engagement member.

A lamp chamber is delimited by the lamp housing 2, the inner lens 3, the outer lens 4, and the lamp cover 5. An interior of the lamp chamber is further divided into right and left spotlight lamp chambers 16, 16 and a central wide-light lamp chamber 17 by two partition walls 15 at right and left ends of the lamp housing 2.

In the right and the left spotlight lamp chambers 16, 16 spotlight sources 6, 6 are arranged, respectively. On the other hand, in the central wide-light lamp chamber 17, the wide-light source 7 is arranged.

The spotlight source 6 is a semiconductor-type light source such as an LED having light directionality. The spotlight source 6 has a unit structure including a main body, a light-radiating unit which is provided on one surface of the main body to radiate light, and a fin-like heat sink member 19 which is provided on another surface of the main body and has a fin-like shape. More specifically, the spotlight source 6 includes a chip (not shown) of a semiconductor-type light source, a substrate (not shown) on which the chip is mounted, a lens 18 which covers the chip and the substrate, the fin-like heat sink member 19 which is directly or indirectly attached to the substrate via a heat-conductive member (not shown) and has plural fins (four fins in the embodiment), and a resin casing 20 which holds the chip, the substrate, the lens 18, and the heat sink member 19. The chip, the substrate, and the casing 20 constitute the main body of the spotlight source 6, whereas the lens 18 constitutes the light-radiating unit of the spotlight source 6.

Each of the spotlight sources 6, 6 is secured to the lamp housing 2 via the bracket 21 with a screw 22 or a caulking 28. As a result, the spotlight sources 6, 6 are arranged in the right and the left spotlight lamp chambers 16, 16, respectively. The lens 18 of the spotlight source 6 is arranged at the side of the inner lens 3 and the outer lens 4. On the other hand, the heat sink member 19 of the spotlight source 6 is arranged at the side of the lamp housing 2. The bracket 21 has functions of securing the spotlight source 6, and of guiding and discharging heat generated by the spotlight source 6 in a predetermined direction.

Figure 10:
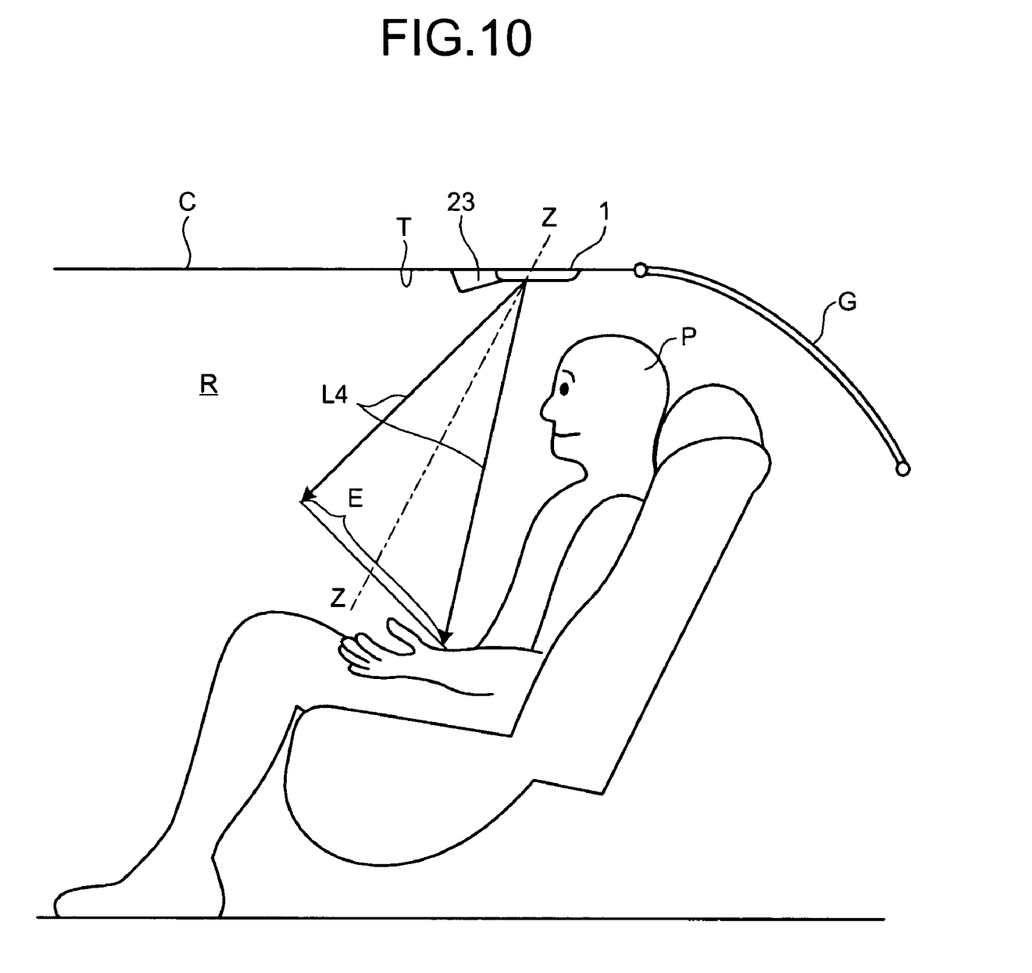
FIG. 10 is a view for explaining a use situation of the vehicle interior lamp according to the embodiment.

A light axis (i.e., axis on which light directionality is 0°) of the spotlight source 6 which is configured with the semiconductor-type light source such as an LED having light directionality is aligned with a light-radiation direction Z-Z of the spotlight source 6. The light-radiation direction Z-Z is inclined to an attachment surface of a ceiling trim T of an interior R of a vehicle (automobile) C as shown in FIG. 10. Further, the light-radiation direction Z-Z extends along a line connecting a predetermined point (which is a substantially central point) in a range E illuminated by spotlight L4 radiated from the spotlight source 6, and a substantially central point of the chip. The range E illuminated by the spotlight L4 radiated from the spotlight source 6 is, for example, an area at a hand of a person P who sits on a backseat when the vehicle interior lamp 1 is attached to the ceiling trim T above the backseat. In FIG. 10, character "G" indicates a rear window glass.

Figure 3:
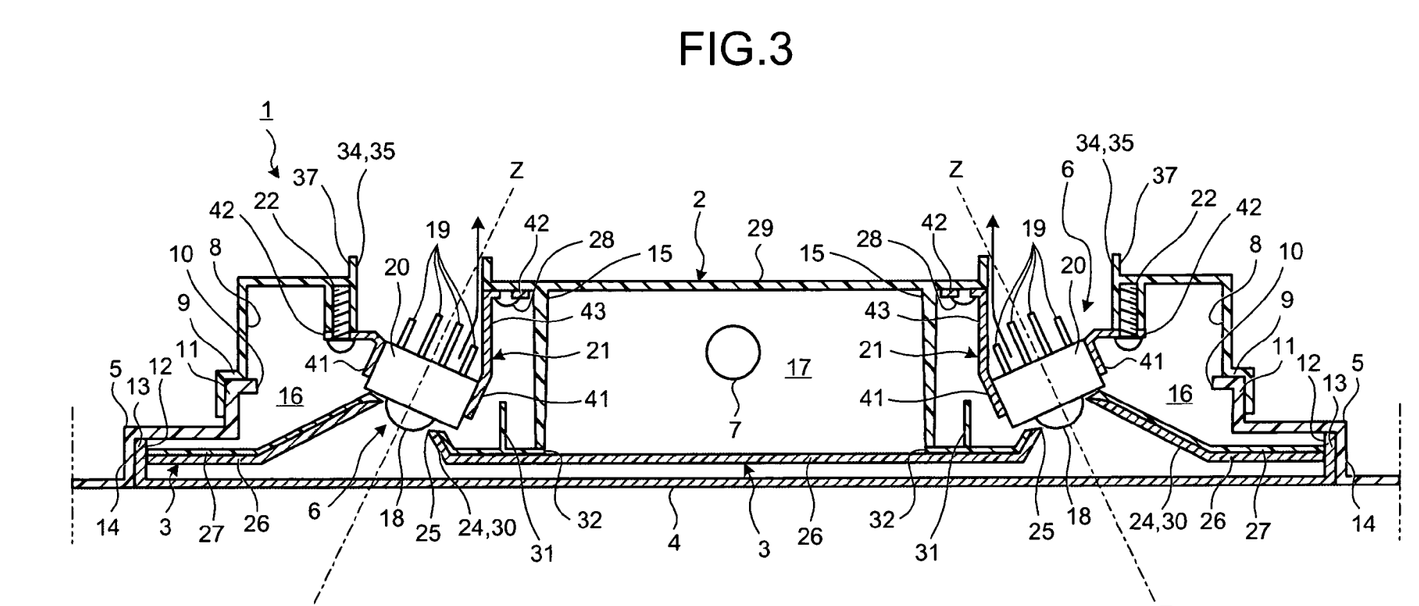
FIG. 3 is a sectional view along line III-III of FIG. 1.
Figure 4:
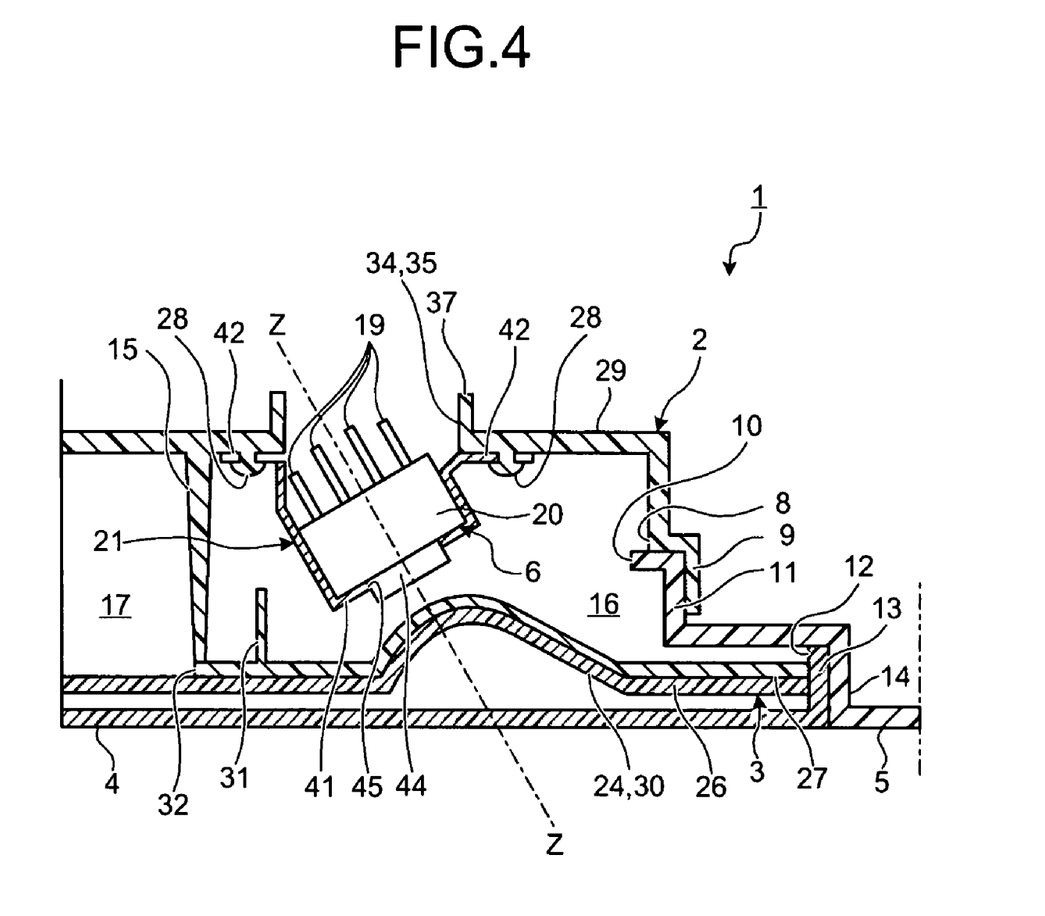
FIG. 4 is a sectional view along line IV-IV of FIG. 1.
Figure 5:
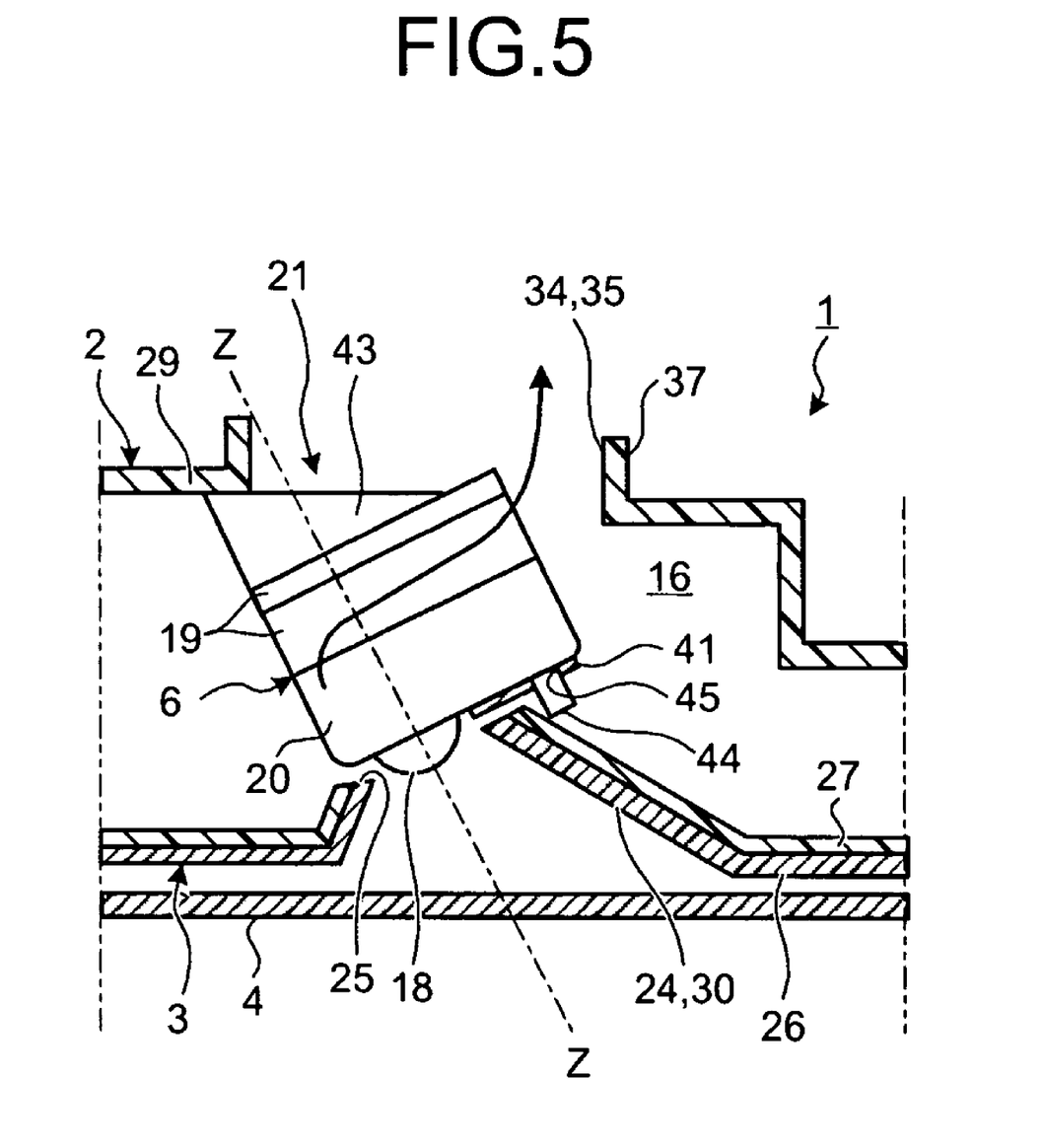
FIG. 5 is a sectional view along line V-V of FIG. 1.

The lamp housing 2 has a bottom plate 29 in a closed portion as an attachment surface, which is attached to the attachment surface of the ceiling trim T of the interior R of the vehicle (automobile) C. As a result, the spotlight source 6 which is arranged in the lamp chamber 16 and secured to the lamp housing 2 is inclined to the bottom plate 29 of the attachment surface of the lamp housing 2 as shown in FIGS. 3 to 5. In other words, the light axis of the spotlight source 6 (i.e., the light-radiation direction Z-Z of the spotlight source 6) is inclined to the bottom plate 29 of the attachment surface of the lamp housing 2.

Figure 6:
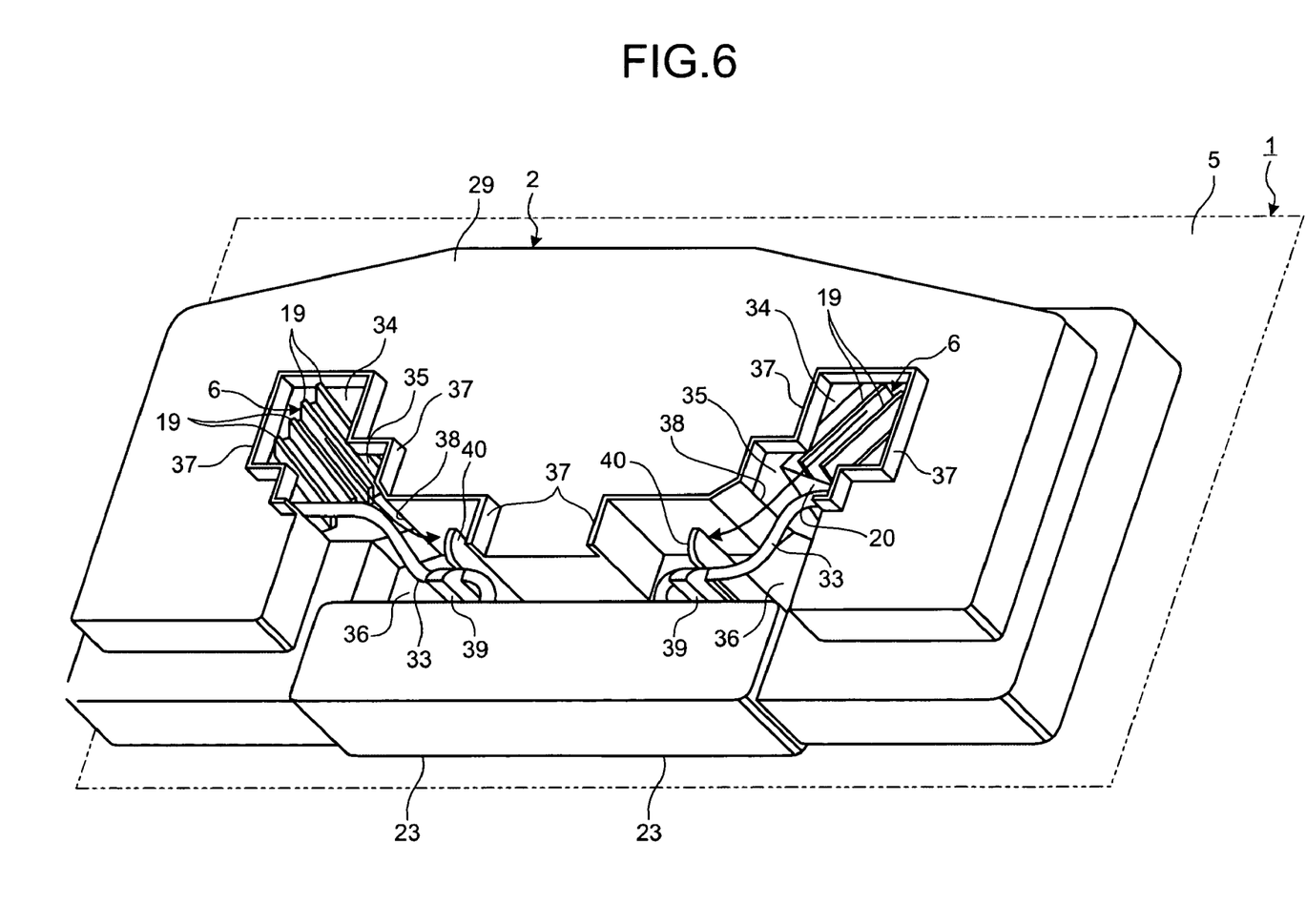
FIG. 6 is a perspective view of the vehicle interior lamp according to the embodiment viewed from a back side.
Figure 7:
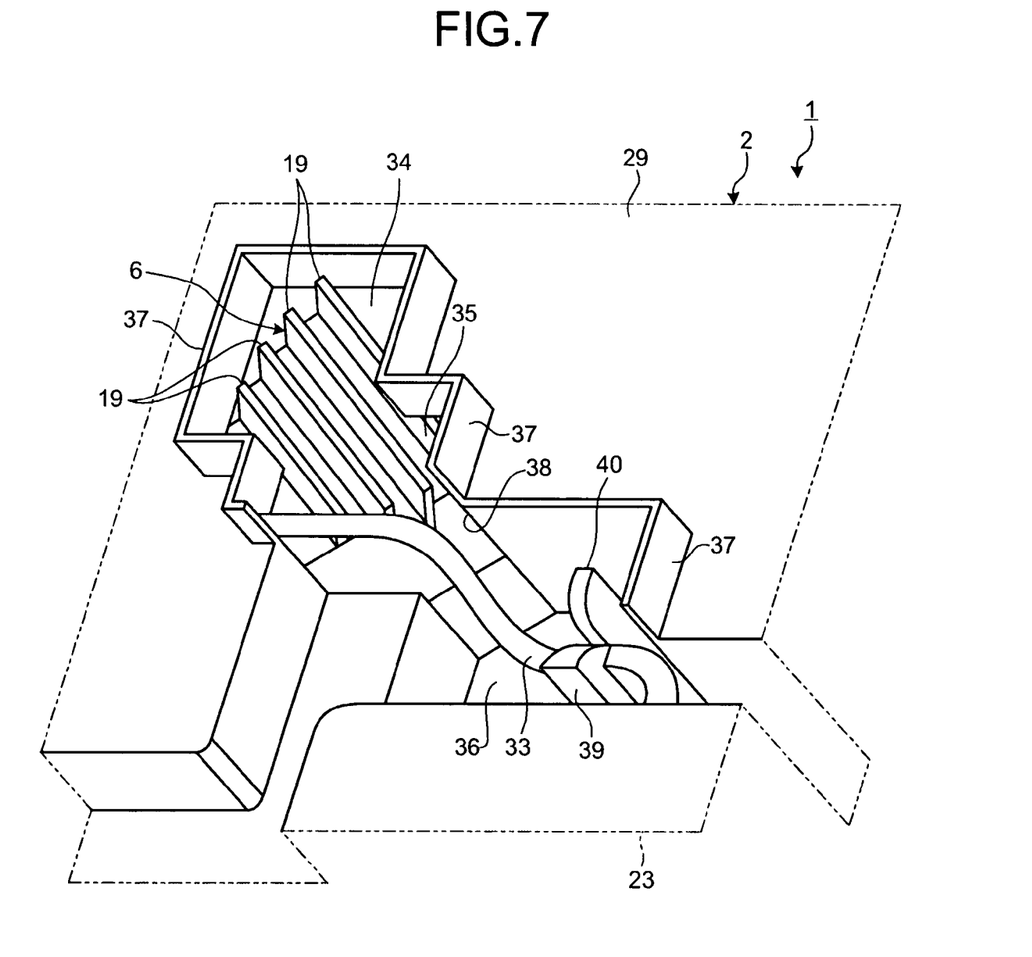
FIG. 7 is an enlarged partial perspective view of the vehicle interior lamp according to the embodiment viewed from the back side.
Figure 8:
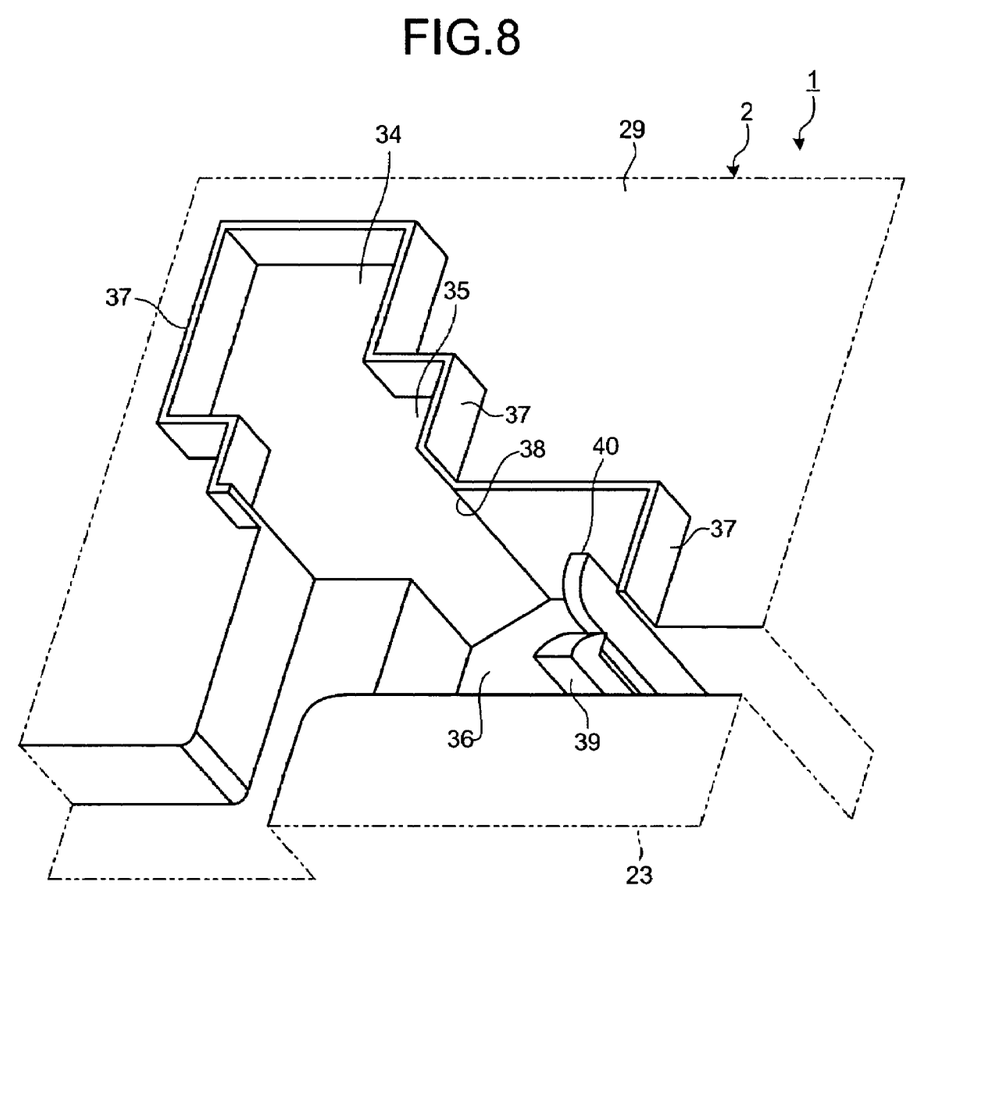
FIG. 8 is an enlarged partial perspective view of the vehicle interior lamp according to the embodiment viewed from the back side with a spotlight source and a harness removed.
Figure 9:
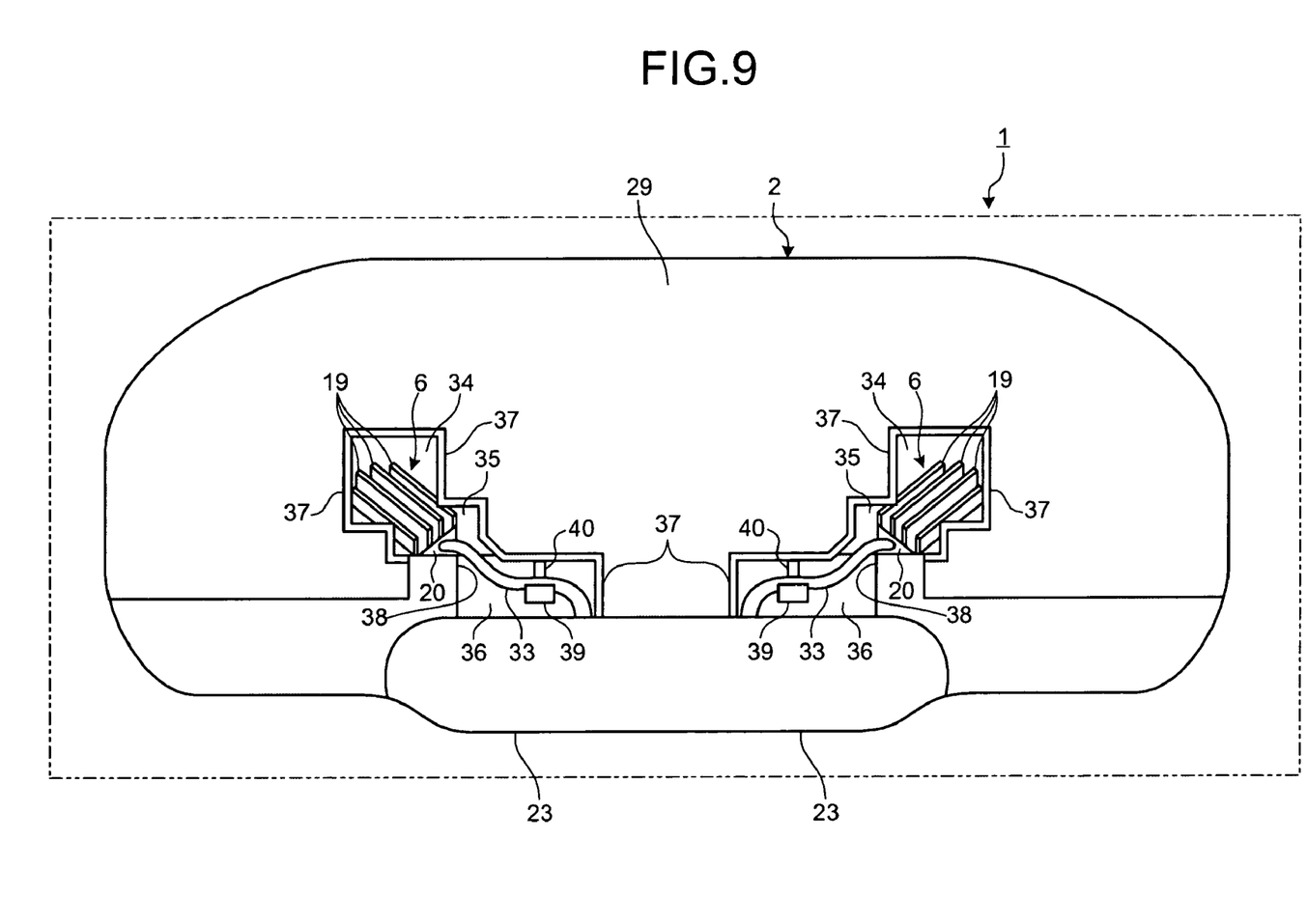
FIG. 9 is a back view of the vehicle interior lamp according to the embodiment.

The fin-like heat sink member 19 of the spotlight source 6 is projected toward an opposite side of the lens 18 from another side of the main body substantially parallel to the light axis of the spotlight source 6 (i.e., the light-radiation direction Z-Z of the spotlight source 6). Therefore, the fin-like heat sink member 19 of the spotlight source 6 is inclined to the bottom plate 29 of the attachment surface of the lamp housing 2. Since the spotlight source 6 is inclined to the bottom plate 29 of the lamp housing 2, the fin-like heat sink member 19 is similarly inclined to the bottom plate 29 of the lamp housing 2. As shown in FIGS. 6, 7, and 9, for example, the fin-like heat sink members 19, 19 of the right and the left spotlight sources 6, 6 are inclined inwardly toward each other to the side of a switch 23 when viewed from the back side of the vehicle interior lamp 1. Further, when viewed along a longitudinal section of the vehicle interior lamp 1 as shown in FIGS. 3 and 4, the fin-like heat sink members 19, 19 of the right and the left spotlight sources 6, 6 are inclined inwardly toward each other. Further, when viewed in a section along a short-side direction of the vehicle interior lamp 1 as shown in FIG. 5, a longitudinal direction of the fin-like heat sink member 19 of the spotlight source 6 is inclined from inside the lamp chamber 16 to the lamp housing 2.

The wide-light source 7 is a bulb-type light source and of a boat-like shape. The wide-light source 7 is secured to the lamp housing 2 with an electrode-cum-holder (not shown). As a result, the wide-light source 7 is arranged in the central wide-light lamp chamber 17.

The spotlight sources 6, 6 are electrically connected to a side of a power source via switches 23, 23 by harnesses 33, 33. The wide-light source 7 is electrically connected to the side of the power source by a harness (not shown) via a door switch (not shown) which is turned on and off when a door of the vehicle is opened or closed or via a main switch (not shown) which is turned on and off by a driver.

In the inner lens 3 serving as the lamp lens, frustum-like depressions 24, 24, for example, circular-truncated-cone-like depressions are formed at positions corresponding to the spotlight sources 6, 6 arranged inside the right and the left spotlight lamp chambers 16, 16. A central axis of the depression 24 substantially coincides with the light-radiation direction Z-Z. At the bottom (at an upper side of the truncate-cone-like shape) of the depressions 24, 24 radiation holes 25, 25 are formed to radiate the light from the spotlight sources 6, 6 onto the interior of the vehicle through the outer lens 4. A portion of the lens 18 serving as the light-radiating unit of the spotlight source 6 is projected outward from the radiation hole 25 (i.e., toward the side of the outer lens 4).

The inner lens 3 as the lamp lens is made by two-color molding and has an outer side formed of a resin member 26 that has a light-guiding function, and an inner side formed of a lighttight resin member 27. The outer member 26 has an incident surface (not shown) for making the light from the spotlight source 6 come into the outer member 26 along the edge of the radiation hole 25. The outer member 26 further has a light-diffusing portion 30 for diffusing the light from the spotlight source 6 on a surface of the depression 24 of the inner lens 3. The light-diffusing portion 30 has numerous extremely small bumps formed through honing or grain finish, for example. The light-diffusing portion 30 is formed within a range where the surface (inclined inner surface) of the depression 24 extends, as shown by hatching in FIG. 1.

On the inner member 27 of the inner lens 3, a light-shielding rib 31 is integrally formed so as to oppose to the partition wall 15. The light-shielding rib 31 prevents the light from the spotlight sources 6, 6 arranged in the right and the left spotlight lamp chambers 16, 16 from leaking into the central wide-light lamp chamber 17. At the same time, the light-shielding rib 31 prevents the light from the wide-light source 7 arranged in the central wide-light lamp chamber 17 from leaking into the right and the left spotlight lamp chambers 16, 16.

The inner member 27 of the inner lens 3 has an opening 32 formed at a position corresponding to the central wide-light lamp chamber 17. The opening 32 of the inner member 27, which is a light tight resin member, serves to pass the light from the wide-light source 7 arranged in the central wide-light lamp chamber 17 through the outer member 26 of the inner lens 3 and the outer lens 4 to illuminate the interior of the vehicle.

As shown in FIGS. 3 to 9, the bottom plate 29 of the lamp housing 2 has backward-heat-discharging openings 34, 34 and lateral-heat-discharging openings 35, 35 formed at positions corresponding to the spotlight sources 6, 6. The backward-heat-discharging openings 34, 34 and the lateral-heat-discharging openings 35, 35 are communicated with a space extending in a direction along the inclination of the fin-like heat sink members 19, 19 of the right and the left spotlight sources 6, 6 (in other words, in a direction inclined inwardly to the side of the switch 23). The backward-heat-discharging opening 34 and the lateral-heat-discharging opening 35 may together form one big opening.

The heat sink member 19 of the spotlight source 6 is arranged in the backward-heat-discharging opening 34 and the lateral-heat-discharging opening 35. Further, as shown in FIG. 5, the longitudinal direction of the fin of the heat sink member 19 is inclined from inside the lamp chamber 16 toward the backward-heat-discharging opening 34 and the lateral-heat-discharging opening 35.

As shown in FIGS. 6 to 9, at portions along the edges of the lateral-heat-discharging openings 35, 35 of the lamp housing 2, a step is formed down to the side of the lamp chamber 16. The step forms heat guiding paths 36, 36. The heat guiding paths 36, 36 are arranged in a predetermined direction from portions of the edges of the lateral-heat-discharging openings 35, 35, in other words, in an inward direction towards the side of the switch 23. On the edges of the backward-heat-discharging opening 34, the lateral-heat-discharging opening 35, and the heat guiding path 36, a heat-guiding protrusion (rib) 37 is formed integrally.

The heat guiding path 36 serves also as a wiring path that houses the harness 33 for wiring. Therefore, the heat guiding path 36 may be a depression, a groove, or a notch other than the step as far as the heat guiding path 36 can house the harness 33 for wiring. The heat guiding path 36 has a holder to hold the harness 33. The holder includes, for example, a notch 38, an elastic claw 39, and a fixing claw 40.

The bracket 21 includes, as shown in FIGS. 2 to 5, a fitting portion 41, a fixing portion 42, and a wall portion 43. The bracket 21 is a strong, elastic member with high heat conductivity, such as a thin steel plate.

The fitting portion 41 is of a U-like shape and securely fits around the casing 20 of the main body of the spotlight source 6. The fitting portion 41 covers an area around the lens 18 on one surface and left and right side surfaces of the casing 20. Alternatively, an elastic fitting unit may be provided to each of the casing 20 and the fitting portion 41, so that the elastic fitting units elastically fit with each other so as to increase a fixing force of the spotlight source 6 and the bracket 21. For example, a fitting hole (not shown) may be formed in the casing 20 while a fitting boss (not shown) may be formed on the fitting portion 41, and the fitting boss may be elastically fitted into the fitting hole.

The fixing portion 42 is formed as a folded side part of the fitting portion and is integral to the fitting portion 41, or formed as an integral folded portion extending from the other side of the fitting portion 41 via the wall portion 43. The lens 18 of the light-radiating unit of the spotlight source 6 is arranged at the side of the inner lens 3 and the outer lens 4 of the lamp lens, whereas the heat sink member 19 of the spotlight source 6 is arranged at the side of the backward-heat-discharging opening 34 and the lateral-heat-discharging opening 35 of the lamp housing 2. In this state, the fixing portion 42 is secured by the screw 22 or the caulking 28 to the edges of the backward-heat-discharging opening 34 and the lateral-heat-discharging opening 35 of the lamp housing 2. As a result, the spotlight source 6 is secured to the lamp housing 2. The fixing portion 42 has a width substantially equal to the width of the fitting portion 41, or the wall portion 43.

The wall portion 43 is arranged between the other side of the fitting portion 41 and the fixing portion 42. In other words, the wall portion 43 is arranged from the spotlight source 6 up to the edges of the backward-heat-discharging opening 34 and the lateral-heat-discharging opening 35. The wall portion 43 guides the heat generated from the spotlight source 6 to the backward-heat-discharging opening 34 and the lateral-heat-discharging opening 35. Further, the wall portion 43 prevents the heat generated from the spotlight source 6 from leaking outside a space enclosed by the wall portion 43, for example, to the side of the lens 18 of the spotlight source 6.

On one surface of the casing 20 of the main body of the spotlight source 6, a positioning boss 44 is integrally formed as a long boss serving as a positioning unit. On the other hand, a positioning hole 45 is formed as an elongated hole in the fitting portion 41 of the bracket 21. When the positioning boss 44 is fitted to the positioning hole 45, positions of the casing 20 and the fitting portion 41 are determined. In this state, the casing 20 and the fitting portion 41 are fitted with each other.

The vehicle interior lamp 1 of the embodiment has the above-described configuration. Functions thereof will be described below.

The vehicle interior lamp 1 according to the embodiment is attached to the ceiling trim T over the backseat in the interior R of the vehicle (automobile) C as shown in FIG. 10, for example, so that the side of the switch 23 is located at the opposite side from the rear window glass G. When the switch 23 is turned on, the spotlight source 6 lights up, and direct light L4 as spotlight passes through the lens 18, through the truncated-circular-cone-shaped depression 24 of the inner lens 3, and the outer lens 4, and illuminates the predetermined range E of the interior of the vehicle.

A part of the light (not shown) from the lens 18 of the spotlight source 6 passes through the radiation hole 25 of the inner lens 3 and hits the light-diffusing portion 30 on the surface of the truncated-circular-cone-shaped depression 24 to be diffused. Further, a part of the light (not shown) from the lens 18 of the spotlight source 6 comes into the outer member 26 through the incident surface of the outer member 26 of the inner lens 3. The incident light coming into the outer member 26 through the incident surface is repeatedly reflected at an outer surface (surface) of the outer member 26 and a boundary between the outer member 26 and the inner member 27 due to a light-guiding function of the outer member 26, and guided in the outer member 26. At the same time, a part of the light (not shown) is emitted to the outside from the outer surface of the outer member 26.

When the door switch or the main switch is turned on, the wide-light source 7 lights up, and the wide light from the wide-light source 7 passes through the outer member 26 of the inner lens 2 and the outer lens 4, so as to widely illuminate a predetermined range in the interior of the vehicle.

When the spotlight source 6 is turned on, the heat is generated in the casing 20 of the main body of the spotlight source 6. The heat is transferred to the heat sink member 19 from the casing 20 of the main body of the spotlight source 6. The heat transferred to the heat sink member 19 is discharged outside the lamp chamber 16 from inside the lamp chamber 16 through the backward-heat-discharging opening 34 and the lateral-heat-discharging opening 35 along the longitudinal direction of the fin of the heat sink member 19 as shown by a solid arrow shown in FIGS. 3, 5, and 6.

Further, the heat generated in the casing 20 of the main body of the spotlight source 6 is prevented from leaking out from a space enclosed by the wall portion 43, e.g., to the side of the lens 18 of the spotlight source 6, by the wall portion 43 of the bracket 21. In addition, the heat generated in the casing 20 of the main body of the spotlight source 6 is guided from inside the lamp chamber 16 to the backward-heat-discharging opening 34 and the lateral-heat-discharging opening 35 by the wall portion 43 of the bracket 21. The heat guided from inside the lamp chamber 16 to the backward-heat-discharging opening 34 and the lateral-heat-discharging opening 35 passes through the backward-heat-discharging opening 34 and the lateral-heat-discharging opening 35, and is discharged outside the lamp chamber 16.

The heat discharged outside the lamp chamber 16 is guided from the lateral-heat-discharging opening 35 along the heat guiding path 36 to the side of the switch 23 at the opposite side from the rear window glass G. Further, the heat discharged from the heat sink member 19 is guided by the heat-guiding protrusion 37 on the edges of the backward-heat-discharging opening 34, the lateral-heat-discharging opening 35, and the heat guiding path 36 to the side of the switch 23 opposite to the rear window glass G.

The vehicle interior lamp 1 of the embodiment has the configuration and functions as described above. Effects thereof will be described below.

In the vehicle interior lamp 1 of the embodiment, the heat generated in the main body of the spotlight source 6 is efficiently discharged through the heat sink member 19 inside the lamp chamber 16, and the backward-heat-discharging opening 34 and the lateral-heat-discharging opening 35 of the lamp housing 2 to the outside of the lamp chamber 16. In other words, the heat generated in the casing 20 of the main body of the spotlight source 6 is transferred from inside the lamp chamber 16 to the side of the backward-heat-discharging opening 34 and the lateral-heat-discharging opening 35 of the lamp housing 2 along the longitudinal direction of the fin of the heat sink member 19 in the heat sink member 19, as shown by a solid arrow in FIG. 5, and efficiently discharged through the backward-heat-discharging opening 34 and the lateral-heat-discharging opening 35 to the outside of the lamp chamber 16. Thus, the vehicle interior lamp 1 of the embodiment takes full measures against heat of the semiconductor-type light source which is the spotlight source 6, whereby a high-output semiconductor-type light source can be used.

Further, in the vehicle interior lamp 1 of the embodiment, the light axis of the spotlight source 6 arranged inside the lamp chamber 16 is substantially parallel to the longitudinal direction of the fin of the heat sink member 19. On the other hand, in the vehicle interior lamp 1 of the embodiment, the light-radiation direction Z-Z of the spotlight source 6 is inclined to the attachment surface of the ceiling trim T of the interior R of the vehicle (automobile) C, i.e., the bottom plate 29 of the attachment surface of the lamp housing 2. Therefore, in the vehicle interior lamp 1 of the embodiment, when the light axis of the spotlight source 6 is aligned with the light-radiation direction Z-Z of the spotlight source 6, the light axis of the spotlight source 6 is inclined to the bottom plate 29 of the attachment surface of the lamp housing 2. As a result, the vehicle interior lamp 1 of the embodiment can readily and securely incline the longitudinal direction of the fin of the heat sink member 19 from the inside of the lamp chamber 16 to the backward-heat-discharging opening 34 and the lateral-heat-discharging opening 35. Therefore, the vehicle interior lamp 1 of the embodiment can efficiently discharge the heat generated in the casing 20 of the main body of the spotlight source 6 from inside the lamp chamber 16 along the longitudinal direction of the fin of the heat sink member 19 which is inclined toward the backward-heat-discharging opening 34 and the lateral-heat-discharging opening 35, from inside the lamp chamber 16 through the backward-heat-discharging opening 34 and the lateral-heat-discharging opening 35 to the outside of the lamp chamber 16.

In addition, the vehicle interior lamp 1 of the embodiment can provide the spotlight with high light directionality readily and securely since the spotlight source 6 is configured with a semiconductor-type light source such as an LED having light directionality. Further, since the vehicle interior lamp 1 of the embodiment can provide the spotlight with high light directionality, glare can be prevented from annoying people other than a user of the spotlight.

Further, as shown by a solid arrow in FIG. 6, in the vehicle interior lamp 1 of the embodiment, the heat generated in the casing 20 of the main body of the spotlight source 6 is guided in a predetermined direction via the heat sink member 19 and through the backward-heat-discharging opening 34 and the lateral-heat-discharging opening 35 of the lamp housing 2 following the heat-guiding path 36, and thereby efficiently discharged outside the lamp chamber 16. Thus, the vehicle interior lamp 1 of the embodiment takes full measures against the heat of the semiconductor-type light source which is the spotlight source 6, whereby a high-output semiconductor-type light source can be used. In particular, the vehicle interior lamp 1 of the embodiment can guide the heat of the spotlight source 6 by the heat guiding path 36 in a predetermined direction, e.g., direction to the side of the switch 23 at the opposite side of the rear window glass G in the embodiment. Thus, the vehicle interior lamp 1 of the embodiment can minimize the inconvenience caused by the discharge of the heat from the spotlight source 6. In particular, the vehicle interior lamp 1 of the embodiment can prevent the fogging of the rear window glass G by guiding the heat of the spotlight source 6 to the opposite side from the rear window glass G.

Further, since the vehicle interior lamp 1 of the embodiment has the heat-guiding protrusion 37 along the edges of the backward-heat-discharging opening 34, the lateral-heat-discharging opening 35, and the heat-guiding path 36, the vehicle interior lamp 1 of the embodiment can guide the heat of the spotlight source 6 in a predetermined direction even more securely. Still further, since the vehicle interior lamp 1 of the embodiment has the heat-guiding protrusion 37 along the edges of the backward-heat-discharging opening 34, the lateral-heat-discharging opening 35, and the heat-guiding path 36, the strength of the lamp housing 2 can be increased.

Still further, in the vehicle interior lamp 1 of the embodiment, the heat-guiding path 36 is also used as the wiring path through which the harness 33 is arranged and electrically connected to the spotlight source 6. Further, the vehicle interior lamp 1 of the embodiment has a fixing unit such as the notch 38, the elastic claw 39, and the fixing claw 40 in the heat-guiding path 36 to secure the harness 33. Therefore, the vehicle interior lamp 1 of the embodiment can arrange the harness 33 of the spotlight source 6 readily and securely in a shortest possible distance. Still further, the vehicle interior lamp 1 of the embodiment simplifies a wiring work of the harness 33 of the spotlight source 6, and shortens the harness 33, whereby manufacturing cost can be decreased. Specifically, when the step provided one level downward is arranged in a power supply unit (i.e., a connector of the harness) of the spotlight source 6, the harness 33 can be arranged in a shortest possible distance. Still further, when the step is provided one level downward in the lamp housing 2, the fixing unit of the harness 33 such as the notch 38, the elastic claw 39, and the fixing claw 40 can be provided outside the lamp housing 2 in the heat-guiding path 36, which is a wiring path of the step.

Still further, in the vehicle interior lamp 1 of the embodiment, the wall portion 43 of the bracket 21 can prevent the heat generated from the spotlight source 6 from leaking outside the space surrounded by the wall portion 43, e.g., to the side of the lens 18 of the spotlight source 6. In addition, as shown by the solid arrow of FIG. 3, the vehicle interior lamp 1 of the embodiment efficiently discharges the heat generated from the spotlight source 6 by guiding the heat from the spotlight source 6 along the wall portion 43 of the bracket 21 to the backward-heat-discharging opening 34 and the lateral-heat-discharging opening 35 of the lamp housing 2, and through the backward-heat-discharging opening 34 and the lateral-heat-discharging opening 35 to the outside of the lamp chamber 16. Thus, the vehicle interior lamp 1 of the embodiment takes full measures against heat of the semiconductor-type light source, which is the spotlight source 6, whereby a high-output semiconductor-type light source can be used.

Still further, in the vehicle interior lamp 1 of the embodiment, the spotlight source 6 is secured to the lamp housing 2 by the bracket 21, whereby the spotlight source 6 can be secured to the lamp housing 2 with a high degree of accuracy. Specifically, even when the light axis of the spotlight source 6 is aligned with the light-radiation direction Z-Z of the spotlight source 6, and the spotlight source 6 is secured to the bottom plate 29 of the attachment surface of the lamp housing 2 in an inclined state, the spotlight source 6 can be secured to the lamp housing 2 in an inclined state with a high degree of accuracy.

Still further, in the vehicle interior lamp 1 of the embodiment, the width of the fixing portion 42 of the bracket 21 is substantially equal to the width of the fitting portion 41 or the wall portion 43 of the bracket 21, and therefore, a sufficient area can be secured for fixing the fixing portion 42 of the bracket 21 to the lamp housing 2. Thus, in the vehicle interior lamp 1 of the embodiment, even when the light axis of the spotlight source 6 is inclined relative to three directions (e.g., X-direction, Y-direction, and Z-direction; for example, X-direction and Y-direction are orthogonal with each other on the bottom plate 29 of the attachment surface of the lamp housing 2, and Z-direction is orthogonal to the bottom plate 29 of the attachment surface of the lamp housing 2), the spotlight source 6 can be secured to the lamp housing 2 with a still higher degree of accuracy.

Still further, in the vehicle interior lamp 1 of the embodiment, the bracket 21 is configured with a strong, elastic member having a high heat conductivity, whereby the effect of discharging the heat from the spotlight source 6 can be further enhanced, and the spotlight source 6 can be securely fixed to the lamp housing 2 via the bracket 21.

Examples other than the above described embodiment will be described below. In the above embodiment, the vehicle interior lamp 1 is explained as being attached to the ceiling trim T over the backseat near the rear window glass G. The present invention, however, can be applied to a vehicle interior lamp attached to a position other than the ceiling trim T over the backseat near the rear window glass G, e.g., a ceiling trim over a front seat near a front window glass.

Further, in the above embodiment, the positioning unit includes the positioning protrusion 44 which is an elongated boss and the positioning hole 45 which is an elongated hole. In the present invention, however, the positioning unit may be configured with an element other than the positioning protrusion 44 as the elongated boss and the positioning hole 45 as the elongated hole. For example, the positioning unit may be configured with one or more small circular protrusion(s) and one or more small circular hole(s).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle interior lamp comprising:
    a light source that is a semiconductor-type light source having light directionality, the light source having a unit structure including a main body, a light-radiating unit that is provided in the main body to radiate light, and a heat sink member that is provided in the main body;
    a lamp housing having a heat-discharge opening arranged at a position corresponding to the light source;
    a lamp lens; and
    a lamp chamber delimited by the lamp housing and the lamp lens, wherein
    the lamp housing has a heat-guiding path arranged in a predetermined direction from a portion of an edge of the heat-discharge opening.

2. The vehicle interior lamp according to claim 1, further comprising
    a heat guiding protrusion arranged along an edge of the heat-discharge opening and an edge of the heat-guiding path.

3. The vehicle interior lamp according to claim 1, wherein
    the heat sink member of the light source has a fin-like shape, and
    the light source is arranged in the lamp chamber in an inclined state relative to an attachment surface of the lamp housing so that a longitudinal direction of a fin of the heat sink member is inclined in a direction from inside the lamp chamber to the heat-discharge opening.

4. The vehicle interior lamp according to claim 1, wherein
    the light source is electrically connected to a side of a power supply by a harness, and
    the harness is arranged from inside the lamp chamber to an outside of the lamp chamber via the heat-discharge opening.

5. The vehicle interior lamp according to claim 1, wherein
    the lamp housing has a step arranged one level downward at a portion of the edge of the heat-discharge opening, and
    the step forms a wiring path where the harness is arranged.

6. The vehicle interior lamp according to claim 5, wherein the step has a fixing unit arranged in the wiring path to secure the harness.

* * * * *